United States Patent [19]

Winquist

[11] Patent Number: 4,818,507
[45] Date of Patent: Apr. 4, 1989

[54] NOVEL PROCESS FOR THE PREPARATION OF ZSM-5 ALUMINOSILICATE ZEOLITE

[75] Inventor: Bruce H. C. Winquist, Houston, Tex.

[73] Assignee: Shell Oil Company, Houston, Tex.

[21] Appl. No.: 885,506

[22] Filed: Jul. 14, 1986

[51] Int. Cl.$^4$ .............................................. C01B 33/28
[52] U.S. Cl. .................................... 423/328; 423/329
[58] Field of Search ............... 423/329, 328, 326, 330; 502/77

[56] References Cited

U.S. PATENT DOCUMENTS

| | | | |
|---|---|---|---|
| 3,758,667 | 9/1973 | Kouwenhoven et al. | 423/118 |
| 3,933,974 | 1/1976 | Winquist | 423/118 |
| 4,073,865 | 2/1978 | Flanigen et al. | 423/339 |

FOREIGN PATENT DOCUMENTS 0098641 6/1983 European Pat. Off. .

Primary Examiner—John Doll
Assistant Examiner—R. Bruce Breneman
Attorney, Agent, or Firm—Kimbley L. Muller

[57] ABSTRACT

A method of manufacture of a ZSM-5 aluminosilicate zeolite is disclosed with specific ingredients in the crystallizing gel and which must be present in certain specified molar proportions. The aqueous gel comprises colloidal silica:colloidal alumina:Na$_3$PO$_4$:KF:water in a ratio of between 20 to 1 to 50 to 1 moles of colloidal silica to colloidal alumina and between 1.8 to 2.7 moles of Na$_3$PO$_4$ per mole of colloidal alumina. It is preferred that greater than 0.5 to less than 2.04 moles of KF per mole of colloidal alumina is also present in the crystallizing gel. Variance from these ingredients or the relative stoichiometry of same results in the production of ferrierite, mordenite or an amorphorous aluminosilicate.

10 Claims, 1 Drawing Sheet

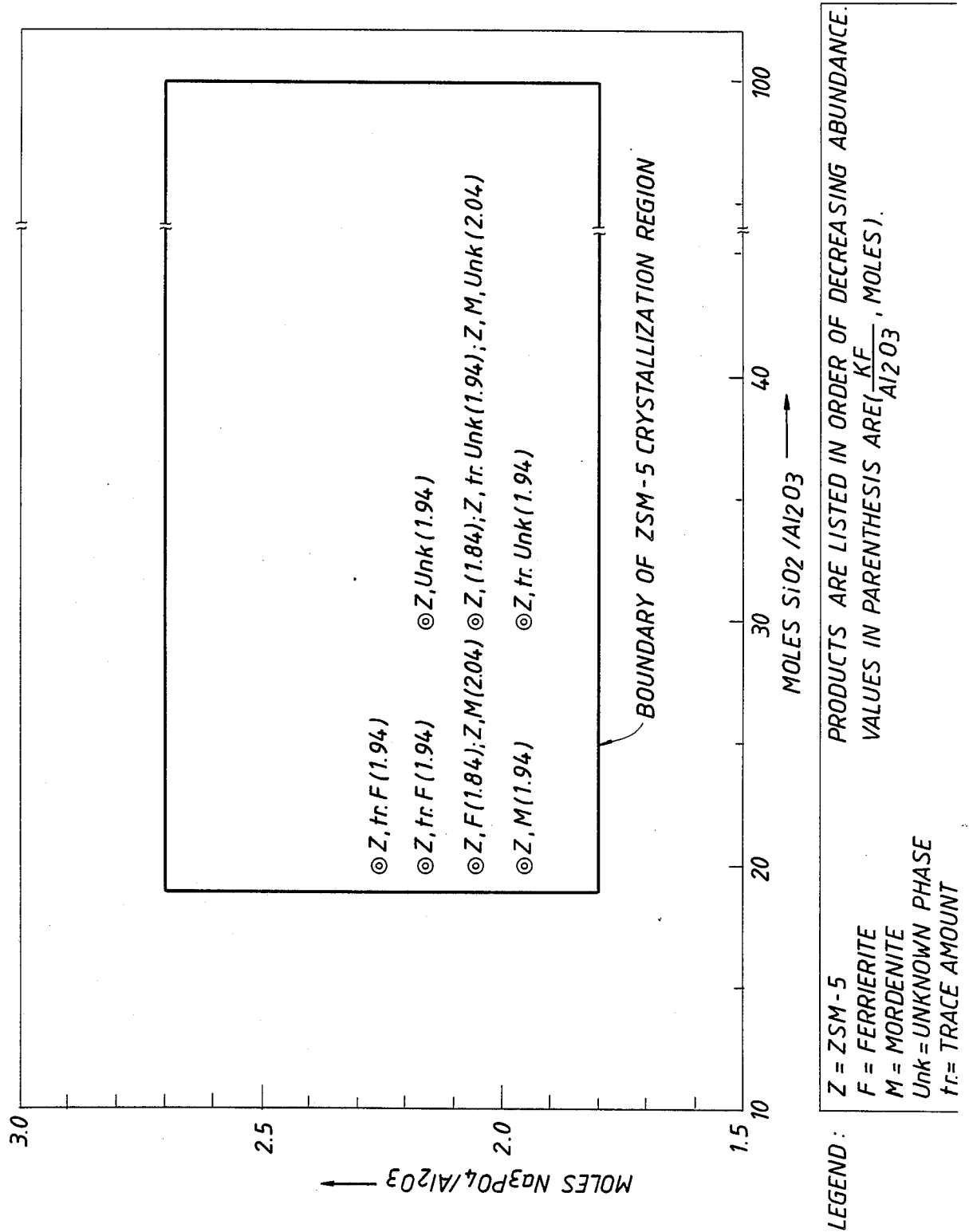

NOVEL PROCESS FOR THE PREPARATION OF ZSM-5 ALUMINOSILICATE ZEOLITE

FIELD OF INVENTION

This invention concerns a method of manufacture whereby a ZSM-5 zeolite is prepared utilizing a hydrolysis method wherein sodium hydroxide is essentially eliminated from the gel precursor as an initial additive and an amine material is not required to drive or direct the crystallization to a ZSM-5 composition of matter. The essential ingredients in zeolite crystallization were originally thought to include an alkali hydroxide, a source of silicon oxide, a source of aluminum oxide and water. It was determined that if a specific chosen amine compound is utilized with these particular reagents, a ZSM-5 aluminosilicate zeolite could be prepared. It is troublesome dealing with an amine in these crystallization gel precursors on account of danger associated with its handling, (toxicity and flammability); and during calcination to remove the amine steam may be formed, which could result in damage to the resultant aluminosilicate. The use of the amine is also expensive.

The field of this invention further concerns a new route to achieve a ZSM-5 aluminosilicate zeolite without resort to the amine method of preparation. Thus, a method of ZSM-5 preparation has been surprisingly achieved which advantageously modifies traditional ZSM-5 gel precursors by avoiding the addition of an amine to the crystallization gel precursor.

BACKGROUND OF THE INVENTION

A hydrolysis method to arrive at a different aluminosilicate zeolite has previously been disclosed in the inventor's U.S. Pat. No. 3,933,974. This hydrolysis method takes advantage of the hydrolysis of a hydrolyzable salt, such as $Na_3PO_4$, to achieve the presence of the hydroxyl ion, which in turn allows for requisite pH of between 10 and 12 necessary for tetrahedral coordination of aluminum or silicon atoms with oxygen. This hydrolysis technique was developed at least in part to obviate the need for a template directive to acquire an aluminosilicate. The basic crystallizing reactants employed in the preparation of the aluminosilicate in the inventor's former mentioned patent are essentially xerogels. These are prepared by heating such materials as Ludox® or sodium aluminate and silica for 1 to 2 hours, filtering, washing with deionized water and heating for an additional hour in one molar $NH_4Cl$ to obtain the xerogel (See Column 6, Example VI). As many as 41 experiments were previously conducted, some of which had a molar ratio of silica to alumina of greater than 20:1 and a molar content of $Na_3PO_4$ to alumina of greater than 2.0. Experiments 16, 28, 29, 33, 36, 37 and 40 indicate that when these stoichiometric relationships are maintained, the resultant aluminosilicate (if not amorphous) is either a mixture of ferrierite, ferrierite and mordenite, or ferrierite, mordenite and adularia.

In an attempt to fine tune this method of preparation, i.e. to eliminate the cumbersome xerogel step of preparation, substitution was made in the crystallization of components comprising a colloidal silica (sometimes referred to as Ludox®) and an alumina hydrogel (sometimes referred to as Nyacol®). It was totally surprising to discover that this change of the silica and alumina reagent sources, i.e. from the former silica-alumina xerogel to colloidal forms of silica and alumina, resulted in the preparation of a ZSM-5 aluminosilicate, not a ferrierite. A second hydrolysis method is disclosed in Kouwenhoven et al, U.S. Pat. No. 3,758,667 for the synthesis of mordenite.

European patent application No. 98,641 indicates that a ZSM-5 composition of matter is prepared utilizing a fairly narrow stoichiometric range of silica to alumina of 20:1 to 50:1. However, even the formulation for this type of aluminosilicate must have a certain quantity of $OH^-$ ions provided by the presence of sodium hydroxide. While the European patentees recognized that a ZSM-5 aluminosilicate is prepared, without resort to an amine template director, it is still absolutely critical to their method of preparation that a substantially large quantity of sodium hydroxide be added, i.e. to provide the $OH^-$ moiety. Table 2 at page 5 establishes the molar ratios of the reagents wherein an exceedingly large quantity of sodium is present in the gel material. Also, Examples 1-14, when modified into Examples 15-18, arrive at a ZSM-5 material but without the use of a colloidal reactant and again with the presence of a relatively large quantity of sodium hydroxide as an additive to the gel.

It has now been surprisingly discovered that techniques of aluminosilicate manufacture can be greatly simplified and yet a manufacturer can still arrive at a ZSM-5 aluminosilicate as long as the proper stoichiometric relationship of the silica and alumina is maintained where the source of these materials is derived from a colloidal source.

OBJECTS AND EMBODIMENTS

An object of this invention is to provide a method of preparation of a ZSM-5 aluminosilicate zeolite in the absence of an amine template director and wherein the method of preparation is essentially free of sodium hydroxide as an initial reactant and is free of an amine additive.

Another object of this invention is to provide a method of preparing a ZSM-5 aluminosilicate zeolite via a hydrolysis reaction using trisodium phosphate, such that a hydroxyl moiety of the gel is generated via the hydrolysis of $Na_3PO_4$.

Another object of this invention is to provide a novel method for the preparation of a ZSM-5 aluminosilicate zeolite catalyst which is suitable for hydrocarbon processing technology including catalytic cracking, lube oil dewaxing, hydrodesulfurization, hydrotreating, ethylbenzene preparation, etc.

Another object of this invention is to provide a simplified method of manufacture of a ZSM-5 catalyst using specific stoichiometric ratios of colloidal silica and colloidal alumina.

Yet another object of this invention is to modify the crystallization ingredients previously established as required to prepare ferrierite and mordenite aluminosilicate zeolites to arrive at a ZSM-5 composition of matter.

Yet another object of this invention is to provide a method of manufacture of a ZSM-5 separatory sieve useful for the separation of organic isomeric entities, i.e. the separation of para-xylene from ortho- and meta-xylene.

One embodiment of this invention resides in a method for the manufacture of a ZSM-5 aluminosilicate zeolite which comprises crystallizing, at crystallization conditions, an aqueous crystallizing gel comprising a colloidal silica, a colloidal alumina, water and trisodium phosphate, wherein said colloidal silica and colloidal alumina are present in a ratio of greater than 20 moles of colloidal silica per mole of colloidal alumina, where said trisodium phosphate is present in a range from about 1.8 to about 2.7 moles of the trisodium phosphate per mole of colloidal alumina and where said gel contains potassium fluoride in a molar ratio of greater than 0.5 to less than 2.1 moles of potassium fluoride per mole of colloidal alumina.

Yet another embodiment of this invention resides in a method of manufacture of a ZSM-5 aluminosilicate zeolite which comprises crystallizing, at crystallization conditions, an aqueous crystallizing gel comprising a colloidal silica, a colloidal alumina, water, trisodium phosphate and potassium fluoride, wherein said colloidal silica and colloidal alumina are present in a ratio of greater than 20 moles of colloidal silica per mole of colloidal alumina, and where said trisodium phosphate is present in a range of from 1.8 to 2.7 moles of said trisodium phosphate per mole of said colloidal alumina and where said potassium fluoride is present in a quantity of from 1.8 to 2.0 moles of said potassium fluoride per mole of said colloidal alumina.

Another embodiment of this invention resides in a process for the manufacture of a ZSM-5 catalyst which is essentially free of sodium hydroxide addition as a crystallizing agent which comprises crystallizing, at crystallization conditions, an aqueous crystallizing gel comprising a colloidal alumina, a colloidal silica, water, trisodium phosphate and potassium fluoride, wherein the mole ratio of said colloidal silica to said colloidal alumina is at least 20 to 1, wherein said trisodium phosphate is present in a stoichiometric range sufficient to provide adequate hydroxyl ions to inure a pH to said gel of from about 10 to about 12 to provide crystallinity to the resultant ZSM-5 aluminosilicate and wherein said potassium fluoride is present in a molar ratio of greater than 0.5 to less than 2.1 moles of potassium fluoride per mole of colloidal alumina.

BRIEF DESCRIPTION OF THE INVENTION

This invention deals with a novel method of preparing a ZSM-5 aluminosilicate zeolite using colloidal silica and colloidal alumina in association with trisodium phosphate and potassium fluoride in the crystallizing gel to provide, via a hydrolysis mechanism, a ZSM-5 aluminosilicate. The stoichiometric ratios of colloidal silica to colloidal alumina is greater than 20 moles of colloidal silica per mole of colloidal alumina. The trisodium phosphate is present in a sufficient quantity to provide a viable hydroxyl ion in order to form the ZSM-5 aluminosilicate, i.e. in a molecular range of 1.8 to 2.7 moles of trisodium phosphate per mole of colloidal alumina. The potassium fluoride is necessary in the crystallizing gel and should be present in a molar ratio based on the quantity of the colloidal alumina of greater than 0.5 to less than 2.1. The instant stoichiometric relationships in this application are recited in regard to the colloidal alumina and silica. This is to be understood that the stoichiometry is based on the active ingredients of the colloids and not on the basis of the non-active ingredients such as the water and stabilizing alkali cations. Thus, one mole of colloidal silica is the weight of colloidal silica that contains 60.08 grams, one formula weight, of $SiO_2$. Similarly, one mole of colloidal alumina is the weight of colloidal alumina that contains 101.96 grams, one formula weight, of $Al_2O_3$.

DETAILED DESCRIPTION OF THE INVENTION

This invention concerns a novel method of preparing a ZSM-5 aluminosilicate in the absence of an amine and in the absence of any substantial quantity of sodium (alkali) ions present as derivative of the addition of sodium hydroxide to the gel. It has surprisingly been found that as a result of the hydrolysis function of trisodium phosphate, crystallization is effected with the required $CH^-/SiO_2$ relaitonship without resort to sodium hydroxide as an additive component to the gel. The essential elements of the crystallization gel are colloidal silica, colloidal alumina, trisodium phosphate, potassium fluoride and water.

The amount of water present in the starting gel mixture has been found to be critical only within the limits of from about 200 to 500 moles of water per mole of colloidal alumina. The gel admixture must have colloidal silica present which is defined as a suspension of silica in water with trace amounts of stabilizing cations such as sodium. The stabilizing sodium cations are present in order to maintain the suspension of $SiO_2$ in water and are not present as an active reagent ingredient in the crystallizing gel. These cations may be present in a content of 0.05 to 1.0 wt% of said colloid. The colloidal silica is preferably a Ludox ® SM-30 produced by the DuPont Corporation. One such other colloidal silica is marketed under the same NYACOL ®, by Nyacol Products, Inc., which is described as follows:

| | |
|---|---|
| Silica wt % | 50 |
| Particle size | 20 microns |
| pH @ 25° C. | 9.0 |
| Viscosity @ 25° C., Cps | 50 |
| Density, lbs/gal | 11.6 |
| Specific gravity | 1.40 |
| $Na_2O$, wt % | 0.20 |

The particular source of the silica colloids is not critical to this invention as other sources as exemplified by Nalco 2326 and Nalco 2327, set forth below, are viable to form the intended ZSM-5.

| Nalco 2326 | |
|---|---|
| Colloidal Silica as $SiO_2$ | 14.5% |
| pH | 9.0 |
| Average Particle Size | 5 microns |
| Specific Gravity @ 68 F | 1.092 |
| Viscosity @ 77 F | 5 cp |
| $Na_2O$ | 0.01% |
| $NH_3$ | 0.3% |

| Nalco 2327 | |
|---|---|
| Nalco 2327 has the following described properties: | |
| Colloidal Silica as $SiO_2$ | 39.8–40.65% |
| pH | 9.3 |
| Average Particle Size | 21–25 microns |
| Specific Gravity @ 68 F | 1.292 |
| Viscosity @ 77 F | 20 cp |
| $Na_2O$ | less than 0.1% |
| $NH_3$ | 0.2% |

A preferred colloidal alumina is Nycol ® colloidal alumina which is defined as an aqueous dispersion of aluminum oxide particles in water with the particles carrying a slightly positive surface charge and a high surface area to weight ratio. This colloidal alumina has been defined with a product description of:

| | |
|---|---|
| Particle size, microns | 5-30 |
| Alumina, Al$_2$O$_3$, wt % | 20 |
| Counter ion, Mol NO$_3$-/mol Al$_2$O$_3$ | 0.49 |
| Specific gravity | 1.19 |
| pH @ 25° C. | 4.0 |
| Viscosity @ 25° C., Centipoise | 7 |

The colloidal alumina is also exemplified by Nalco 155-614 as follows:

| Nalco 155-614 | |
|---|---|
| Alumina | 10% w |
| Average Particle Size | 2 microns |
| Specific Gravity @ 68 F | 1.12-1.13 |
| pH | 5.1 |
| Conductivity | less than 18,000 micromhos |
| Surface Charge | Positive |

The stiochiometric mole ratio of the colloidal alumina to colloidal silica in the gel recipe must be greater than 20 and most preferably is between 20:1 to 50:1. If the stiochiometric mole ratio of colloidal silica to colloidal alumina falls below 20:1 it is most probable that ferrierite, mordenite or an amorphous structure will result from crystallization of the gel. These stoichiometric relationships of colloidal silica to colloidal alumina are based on the relationship of the active silica and alumina ingredients of the colloids added to the gels and not on the per se relationship of the total colloids one versus another.

Trisodium phosphate is present in a range of from 1.8 to 2.7 moles of trisodium phosphate per mole of colloidal alumina. At the silica-to-alumina mole ratio of 20:1, the trisodium phosphate-to-alumina relationship is preferably present at a mole ratio in the range of 2.1:1 to 2.7:1 while at a mole ratio of silica-to-alumina at 30:1, trisodium phosphate-to-alumina mole ratio can be as low as 1.8:1. Again, the trisodium phosphate is present such that during hydrolysis a source of OH$^-$ ions is provided. For example,

Na$_3$PO$_4$+H$_2$O→HPO$_4$$^=$+OH$^-$+3Na$^+$

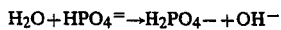

H$_2$O+HPO$_4$$^=$→H$_2$PO$_4$$^-$+OH$^-$

The relationship between the potassium fluoride and the ZSM-5 crystallization is currently unclear but the presence of potassium fluoride in the crystallizing gel is needed. Potassium fluoride should be maintained at a mole ratio of greater than 0.5 to less than 2.1 moles of potassium fluoride per mole of colloid alumina. This relative quantity of potassium fluoride, like that of trisodium phosphate, may also vary with the change in the mole ratio of colloidal silica to colloidal alumina.

The ZSM-5 composition of matter will have an X-ray diffraction the same as, or substantially the same as, the pattern shown below in Table I.

TABLE I

| X-ray Diffraction Pattern | |
|---|---|
| d-spacing, Angstroms | Intensity, Normalized |
| 11.22 | 19 |
| 10.03 | 18 |
| 9.74 | 9 |
| 7.49 | 2 |

TABLE I-continued

| X-ray Diffraction Pattern | |
|---|---|
| d-spacing, Angstroms | Intensity, Normalized |
| 6.74 | 3 |
| 6.39 | 6 |
| 6.03 | 8 |
| 5.73 | 5 |
| 5.58 | 9 |
| 5.00 | 5 |
| 4.63 | 5 |
| 4.38 | 8 |
| 4.28 | 12 |
| 4.11 | 10 |
| 4.02 | 9 |
| 3.87 | 100 |
| 3.82 | 81 |
| 3.76 | 46 |
| 3.73 | 61 |
| 3.66 | 32 |
| 3.61 | 5 |
| 3.49 | 10 |
| 3.45 | 15 |
| 3.38 | 10 |
| 3.32 | 15 |
| 3.26 | 7 |
| 3.15 | 5 |
| 3.06 | 15 |
| 2.99 | 21 |
| 2.95 | 8 |
| 2.88 | 4 |
| 2.74 | 6 |
| 2.69 | 3 |
| 2.62 | 6 |
| 2.52 | 7 |
| 2.495 | 12 |
| 2.425 | 6 |
| 2.397 | 6 |
| 2.330 | 2 |
| 2.183 | 2 |
| 2.085 | 2 |
| 2.051 | 3 |
| 2.018 | 17 |
| 1.998 | 20 |
| 1.959 | 6 |
| 1.924 | 7 |
| 1.879 | 8 |
| 1.771 | 5 |
| 1.678 | 7 |
| 1.664 | 8 |
| 1.612 | 2 |
| 1.568 | 2 |
| 1.524 | 3 |
| 1.492 | 7 |
| 1.468 | 9 |
| 1.449 | 10 |
| 1.429 | 8 |
| 1.415 | 7 |
| 1.401 | 9 |
| 1.388 | 5 |
| 1.366 | 4 |
| 1.346 | 2 |
| 1.331 | 3 |

The crystallization of the crystallizing gel is effected at hydrothermal treatment conditions including a temperature between about 185° C. and to about 250° C. at any desirable pressure. Time of crystallization must be sufficient to inure crystallization of a product with the X-ray diffraction pattern of the ZSM-5 the same as or substantially the same as shown in Table I. A time of 20 to 150 hours is preferred, although once crystallization is initiated, total or near complete crystallization is established very quickly. Further time of crystallization via hydrothermal treatment does little to enhance the catalytic or separatory prowess of the resultant ZSM-5 aluminosilicate although it should be considered to be within the scope of this invention.

BRIEF DESCRIPTION OF THE DRAWING

FIG. 1 is a graphic depiction of the crystallization reactant target area necessary for derivation of a ZSM-5 aluminosilicate using the claimed ingredients of the crystallization gel.

DETAILED DESCRIPTION OF THE DRAWING

FIG. 1 demonstrates the particular quantity of colloidal silica to colloidal alumina necessary to form a ZSM-5 aluminosilicate. The stiochiometric quantity of trisodium phosphate and potassium fluoride must also be present in order to adequately depict the ZSM-5 target area. If any of the stoichiometric relationships are violated, extrinsic from the instant depicted target area, different aluminosilicate will probably be formed and not the desired ZSM-5 aluminosilicate.

EXAMPLES

The following examples are intended to exemplify and describe the stoichiometric relationship of components required to derive a ZSM-5 aluminosilicate. These results are not to be construed as a limitation upon the claims hereinafter set forth.

Table II shows the amount of reactants added to a crystallizing admixture as follows:

A prescribed amount of reagent grade trisodium phosphate ($Na_3PO_4:12\ H_2O$) and anhydrous potassium fluoride were dissolved in a prescribed quantity of deionized water. A prescribed amount of phosphoric acid $H_3PO_4$, Nycol® colloidal alumina (20% $Al_2O_3$, 0.49 mole $NO_3$/mole $Al_2O_3$) and Ludox® colloidal silica (0.20%w $Na_2O$, 50%w $SiO_2$) were added to the solution of trisodium phosphate and potassium fluoride.

The mixture was transferred to a one gallon stirred autoclave and heated with stirring for 64 hours at 210° C. The product slurry was filtered, washed with deionized water and dried at 125° C. for 16 hours. The product was characterized by X-ray powder diffraction techniques using a Philips APD 3600 powder diffractometer, employing monochromatic Cu Kα radiation, with a scan step size of 0.020 degrees (2θ), counting for 0.5 seconds at each step. The prescribed amounts of reagent (in grams) and results of the X-ray powder diffraction are set forth in Table II.

TABLE II

| Experiment No. | $Na_3PO_4$ | $H_3PO_4$ | KF | Colloidal $Al_2O_3$ | Colloidal $SiO_2$ | Molar Ratio $Al_2O_3/SiO_2$ | $H_2O$ | Ratio $Na_3PO_4/Al_2O_3$ | Ratio $KF/Al_2O_3$ | Temp °C. | Time (hrs) | Product Structure 1,2 | Weight of Product |
|---|---|---|---|---|---|---|---|---|---|---|---|---|---|
| 1 | 147.6 | 1.1 | 20.9 | 94.4 | 444.7 | 20:1 | 791 | 2.15:1 | 1.94:1 | 210 | 64 | ZSM-5, TR-ferrierite | 256 |
| 2 | 154.3 | 1.1 | 20.8 | 94.2 | 443.8 | 20:1 | 786 | 2.25:1 | 1.94:1 | 210 | 64 | ZSM-5, TR-ferrierite | 247 |
| 3 | 130.7 | 1.5 | 19.4 | 88.0 | 622.0 | 30:1 | 638 | 2.07:1 | 1.94:1 | 190 | 64 | ZSM-5, TR unknown | 367 |
| 4 | 130.6 | 1.5 | 20.4 | 87.9 | 621.6 | 30:1 | 638 | 2.07:1 | 2.04:1 | 190 | 64 | ZSM-5, Mordenite, TR-unknown | 333 |
| 5 | 130.7 | 1.5 | 18.5 | 88.1 | 622.4 | 30:1 | 639 | 2.07:1 | 1.84:1 | 190 | 64 | ZSM-5 | 342 |
| 6 | 124.3 | 1.5 | 19.5 | 88.2 | 623.2 | 30:1 | 643 | 1.97:1 | 1.94:1 | 190 | 64 | ZSM-5, TR unknown | 388 |
| 7 | 137.0 | 1.5 | 19.4 | 87.8 | 620.8 | 30:1 | 633 | 2.17:1 | 1.94:1 | 190 | 64 | ZSM-5, unknown | 358 |
| 8 | 130.7 | 1.5 | 19.4 | 88.0 | 622.0 | 30:1 | 638 | 2.07:1 | 1.94:1 | 180 | 64 | ZSM-5, Amorphous | 370 |
| 9 | 142.1 | 1.1 | 22.0 | 94.5 | 445.1 | 20:1 | 795 | 2.07:1 | 2.04:1 | 190 | 64 | ZSM-5, Mordenite | 245 |
| 10 | 191.3 | 1.4 | 28.0 | 121.2 | 571.1 | 20:1 | 587 | 2.17:1 | 2.03:1 | 190 | 64 | ZSM-5, Quartz | 329 |
| 11 | 142.3 | 1.1 | 19.8 | 94.6 | 445.8 | 20:1 | 796 | 2.07:1 | 1.84:1 | 190 | 64 | ZSM-5, Ferrierite | 218 |
| 12 | 135.4 | 1.1 | 20.9 | 94.7 | 446.4 | 20:1 | 801 | 1.97:1 | 1.94:1 | 190 | 64 | ZSM-5, Mordenite | 210 |

1-TR = TRACE;
2-In order of decreasing abundance

This data must be reviewed in light of the results achieved in my U.S. Pat. No. 3,933,974. The following experiments shown in summary via Table III (See Columns 5 and 6) were performed within the stoichiometric relationships here claimed but different aluminosilicate products were attained vis-a-vis Table II as a result of the addition of different types of reagents to the gel.

TABLE III

| Experiment No. | $Na_3PO_4$ | KF | $SiO_2$ | $Al_2O_3$ | $H_2O$ | Products |
|---|---|---|---|---|---|---|
| 16 | 2.07 | 4.0 | 20.4 | 1.0 | 246 | Ferrierite |
| 28 | 2.07 | 1.0 | 21.0 | 1.0 | 246 | Ferrierite |
| 29 | 2.07 | 1.0 | 24.1 | 1.0 | 246 | Ferrierite, Mordenite |
| 33 | 2.07 | 2.3 | 24.1 | 1.0 | 246 | Amorphous |
| 36 | 2.07 | 3.0 | 21.0 | 1.0 | 246 | Ferrierite |
| 37 | 2.07 | 3.0 | 24.1 | 1.0 | 246 | Ferrierite |
| 40 | 2.07 | 4.0 | 21.0 | 1.0 | 246 | Ferrierite, Adularia, Mordenite |
| 41 | 2.07 | 4.0 | 24.1 | 1.0 | 246 | Ferrierite, Adularia, Mordenite |

The products of Table II are predominantly ZSM-5 aluminosilicates while Table III is predominantly ferrierite. The differences in the experiments of Table II versus Table III is use of colloidal alumina and colloidal silica in substitution of the xerogel. The former surprisingly results in a ZSM-5 aluminosilicate while the latter produced ferrierite. The reasons behind this difference are not totally understood at this time.

I claim as my invention:

1. A method of manufacture of a ZSM-5 aluminosilicate zeolite which comprises crystallizing, at a temperature of from about 185° C. to about 250° C., an aqueous crystallizing gel consisting essentially of a colloidal silica, a colloidal alumina, water, trisodium phosphate and potassium fluoride, wherein said water is present in a range of from about 200 to about 500 moles of water per mole of colloidal alumina, wherein said colloidal silica and said colloidal alumina are present in a molar ratio of greater than about 20 moles of said colloidal silica per mole of said colloidal alumina and less than 50 moles of said colloidal silica per mole of said colloidal alumina, wherein said trisodium phosphate is present in a mole ratio of 1.8 to 2.7 moles of said trisodium phosphate per mole of said colloidal alumina and wherein said potassium fluoride is present in a molar relationship of greater than 0.5 to less than 2.1 moles of potassium fluoride per mole of colloidal alumina.

2. The method of claim 1 wherein said molar ratio of colloidal silica to said colloidal alumina is from 20 to 30 moles of colloidal silica per mole of said colloidal alumina.

3. The method of claim 2 wherein said molar ratio of colloidal silica to colloidal alumina is in the range of 20 to 30, and said molar ratio of trisodium phosphate per mole of colloidal alumina is equal to 2.1 to 2.4 when said ratio of colloidal silica to colloidal alumina is equal to about 20 to 1 and from about 1.8 to 2.7 when said ratio of colloidal silica to colloidal alumina is equal to about 30 to 1.

4. The method of claim 3 wherein said crystallizing occurs over a period of time sufficient to yield said ZSM-5 aluminosilicate equal to from about 20 hours to about 150 hours.

5. A method of manufacture of a ZSM-5 aluminosilicate zeolite which comprises crystallizing, at a temperature of from about 185° C. to about 250° C., an aqueous crystallizing gel consisting essentially of a colloidal silica, a colloidal alumina, water, trisodium phosphate and potassium fluoride, wherein said water is present in a range of from about 200 to about 500 moles of water per mole of colloidal alumina, wherein said colloidal silica and colloidal alumina are present in a molar ratio of greater than 20 moles of colloidal silica per mole of colloidal alumina and less than 50 moles of said colloidal silica per mole of colloidal alumina, wherein said trisodium phosphate is present in a range of from 1.8 to 2.7 moles of said trisodium phosphate per mole of colloidal alumina and wherein said potassium fluoride is present in a molar ratio of from 1.8 to 2.0 moles of potassium fluoride per mole of said colloidal alumina.

6. The method of claim 5 wherein said colloidal silicate comprises a suspension of silicon dioxide in water with stabilizing cations therein.

7. The method of claim 6 wherein said stabilizing cations comprise sodium ions in a weight content of from 0.05 to 1.0 wt%.

8. The method of claim 7 wherein said colloidal alumina comprises a suspension of alumina in water with stabilizing cations.

9. The method of claim 8 wherein said stabilizing cations comprise sodium ions in a quantity of from 0.05 to 1.0 wt%.

10. The method of claim 5 wherein said crystallizing occurs over a period of time sufficient to yield a ZSM-5 aluminosilicate of from about 20 hours to about 150 hours.

* * * * *